US012663835B1

(12) United States Patent
Chi et al.

(10) Patent No.: US 12,663,835 B1
(45) Date of Patent: Jun. 23, 2026

(54) SYSTEMS AND METHODS FOR AUDIO AND COMPONENT SYSTEM CONTROL FOR NOTEBOOK IN OPEN POSITION AND CLOSED POSITION

(71) Applicant: Dell Products L.P., Round Rock, TX (US)

(72) Inventors: Wei-Hsiang Chi, Taipei (TW); Brandon J. Brocklesby, Pflugerville, TX (US); Jace W. Files, Round Rock, TX (US); John T. Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,187

(22) Filed: Jan. 24, 2025

(51) Int. Cl.
*G06F 1/16* (2006.01)
*G06F 3/16* (2006.01)

(52) U.S. Cl.
CPC .......... *G06F 1/1677* (2013.01); *G06F 1/1688* (2013.01); *G06F 3/16* (2013.01)

(58) Field of Classification Search
CPC ......... G06F 1/1677; G06F 1/1688; G06F 3/16
See application file for complete search history.

(56) References Cited

U.S. PATENT DOCUMENTS

| | | | |
|---|---|---|---|
| 2007/0061564 A1* | 3/2007 | Park | G06F 9/441 713/100 |
| 2014/0152598 A1* | 6/2014 | Tu | G06F 1/3262 345/173 |
| 2021/0248347 A1* | 8/2021 | Seo | G06V 40/1329 |
| 2023/0046377 A1* | 2/2023 | Yeo | G06F 1/3215 |

* cited by examiner

*Primary Examiner* — Brent D Castiaux
(74) *Attorney, Agent, or Firm* — Jackson Walker L.L.P.

(57) ABSTRACT

An information handling system may include a keyboard assembly, a display assembly rotatably coupled to the keyboard assembly, a user interface comprising input/output devices, and a processor. The processor may be configured to when the display assembly is in an open position relative to the keyboard assembly, selectively enable a first set of the input/output devices and selectively disable a second set of the input/output devices to optimize operation in a normal operational mode of the information handling system, and when the display assembly is in a closed position relative to the keyboard assembly, selectively enable a third set of the input/output devices different from the first set of input/output devices and selectively disable a fourth set of the input/output devices different from the second set of input/output devices to optimize operation in a special operational mode of the information handling system.

18 Claims, 5 Drawing Sheets

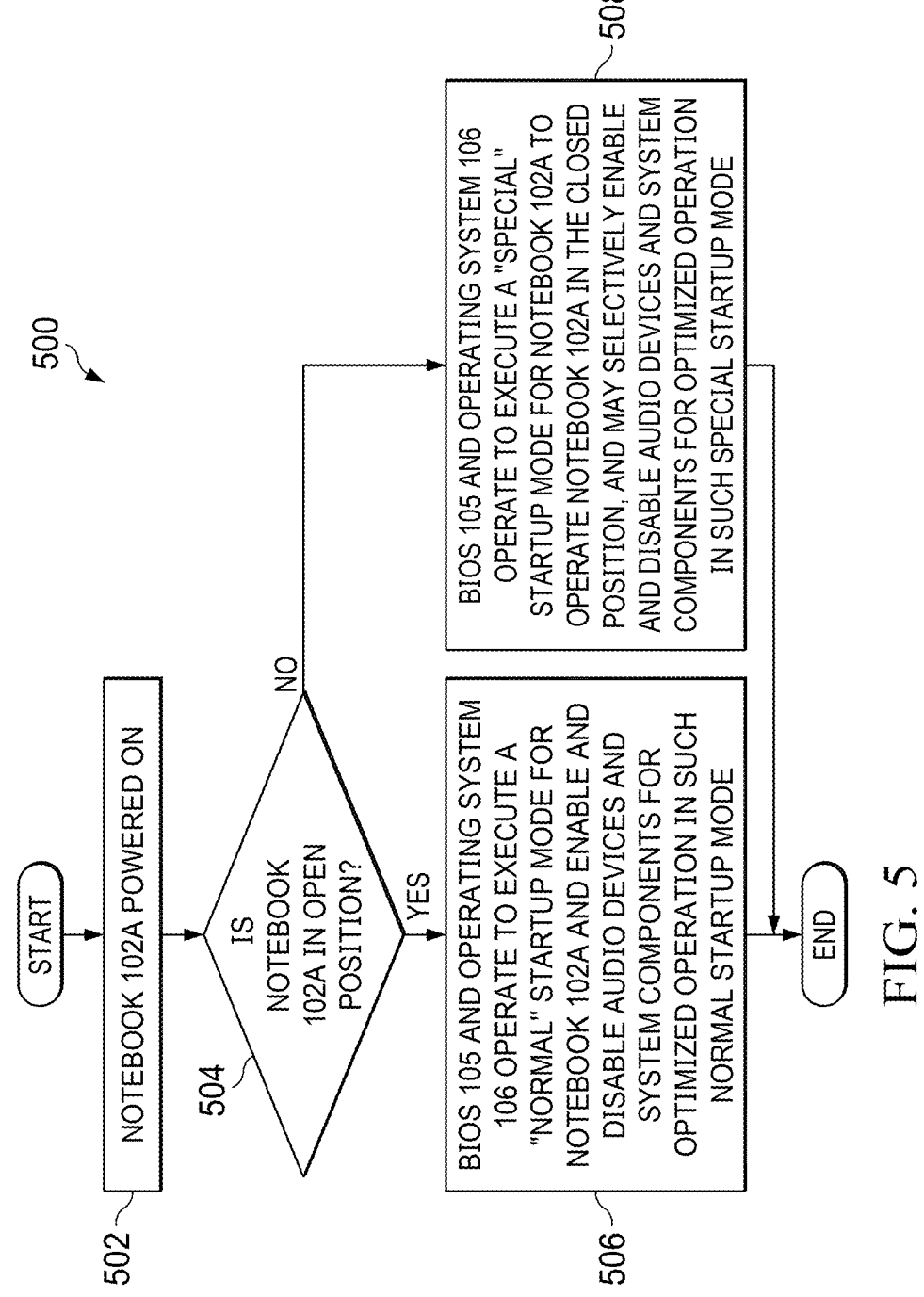

500

START

502 — NOTEBOOK 102A POWERED ON

504 — IS NOTEBOOK 102A IN OPEN POSITION?

NO

YES

506 — BIOS 105 AND OPERATING SYSTEM 106 OPERATE TO EXECUTE A "NORMAL" STARTUP MODE FOR NOTEBOOK 102A AND ENABLE AND DISABLE AUDIO DEVICES AND SYSTEM COMPONENTS FOR OPTIMIZED OPERATION IN SUCH NORMAL STARTUP MODE

508 — BIOS 105 AND OPERATING SYSTEM 106 OPERATE TO EXECUTE A "SPECIAL" STARTUP MODE FOR NOTEBOOK 102A TO OPERATE NOTEBOOK 102A IN THE CLOSED POSITION, AND MAY SELECTIVELY ENABLE AND DISABLE AUDIO DEVICES AND SYSTEM COMPONENTS FOR OPTIMIZED OPERATION IN SUCH SPECIAL STARTUP MODE

END

FIG. 5

SYSTEMS AND METHODS FOR AUDIO AND COMPONENT SYSTEM CONTROL FOR NOTEBOOK IN OPEN POSITION AND CLOSED POSITION

TECHNICAL FIELD

The present disclosure relates in general to information handling systems, and more particularly to systems and methods for controlling audio and component systems of a notebook in an open position and a closed position of the notebook.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a notebook computer, which may also be referred to as a laptop. A notebook may comprise a display assembly rotatably coupled to a keyboard assembly via a hinge, allowing a user to open the display assembly relative to the keyboard assembly to a desired angle, as well as close the keyboard assembly relative to the display assembly to an angle of approximately zero degrees.

Increasingly, notebooks are being designed to remain at least partially functional and undertake particular tasks when closed. For example, a notebook may playback audio, conduct an audio conference, record audio, or undertake other tasks while closed. Accordingly, it may be desirable to optimize a notebook for operation in the different operating modes of an open position and a closed position.

SUMMARY

In accordance with the teachings of the present disclosure, the disadvantages and problems associated with traditional approaches to managing audio and component systems in a notebook may be substantially reduced or eliminated.

In accordance with embodiments of the present disclosure, an information handling system may include a keyboard assembly, a display assembly rotatably coupled to the keyboard assembly, a user interface comprising input/output devices, and a processor. The processor may be configured to when the display assembly is in an open position relative to the keyboard assembly, selectively enable a first set of the input/output devices and selectively disable a second set of the input/output devices to optimize operation in a normal operational mode of the information handling system, and when the display assembly is in a closed position relative to the keyboard assembly, selectively enable a third set of the input/output devices different from the first set of input/output devices and selectively disable a fourth set of the input/output devices different from the second set of input/output devices to optimize operation in a special operational mode of the information handling system.

In accordance with these and other embodiments of the present disclosure, a method may be provided for an information handling system having a keyboard assembly, a display assembly rotatably coupled to the keyboard assembly, and a user interface comprising input/output devices. The method may include when the display assembly is in an open position relative to the keyboard assembly, selectively enabling a first set of the input/output devices and selectively disabling a second set of the input/output devices to optimize operation in a normal operational mode of the information handling system. The method may also include when the display assembly is in a closed position relative to the keyboard assembly, selectively enabling a third set of the input/output devices different from the first set of input/output devices and selectively disabling a fourth set of the input/output devices different from the second set of input/output devices to optimize operation in a special operational mode of the information handling system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system having a keyboard assembly, a display assembly rotatably coupled to the keyboard assembly, and a user interface comprising input/output devices: when the display assembly is in an open position relative to the keyboard assembly, selectively enable a first set of the input/output devices and selectively disable a second set of the input/output devices to optimize operation in a normal operational mode of the information handling system; and when the display assembly is in a closed position relative to the keyboard assembly, selectively enable a third set of the input/output devices different from the first set of input/output devices and selectively disable a fourth set of the input/output devices different from the second set of input/output devices to optimize operation in a special operational mode of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 illustrates a flow chart of an example method for controlling audio and component systems of a notebook between an open position and a closed position of the notebook, in accordance with embodiments of the present disclosure.

DETAILED DESCRIPTION

Preferred embodiments and their advantages are best understood by reference to FIGS. 1 through 5, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1:
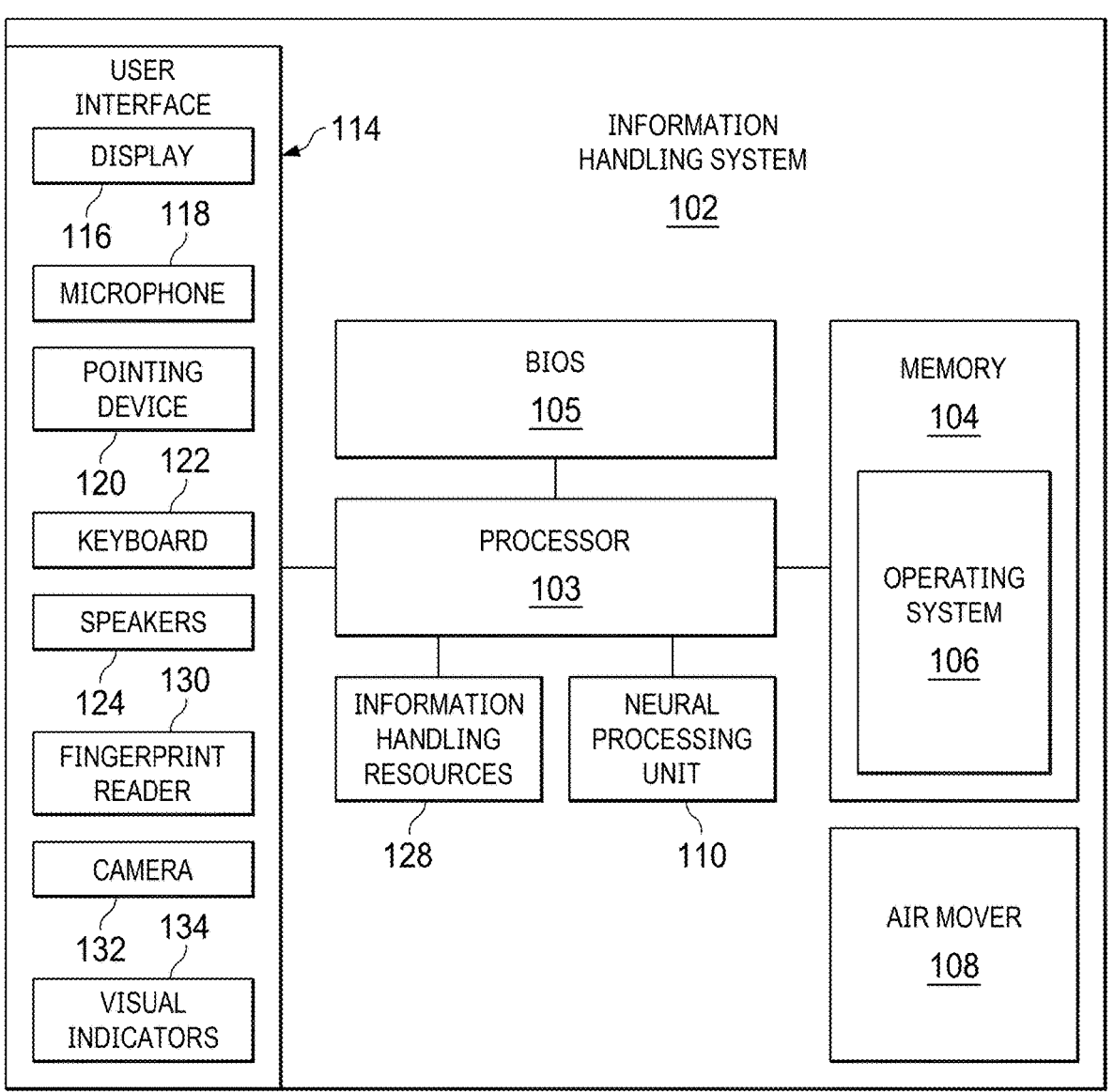
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. In some embodiments, information handling system 102 may comprise or be an integral part of a server. In some embodiments, information handling system 102 may be a personal computer (e.g., a desktop computer or a portable computer). In other embodiments, information handling system 102 may comprise a mobile device (e.g., a smart phone, a tablet computing device, a handheld computing device, a personal digital assistant, or any other device that may be readily transported on a person of a user of such mobile device).

As depicted in FIG. 1, information handling system 102 may include a processor 103, a memory 104 communicatively coupled to processor 103, BIOS 105, an air mover 108, a neural processing unit 110 communicatively coupled to processor 103, a user interface 114 communicatively coupled to processor 103, and one or more information handling resources 128 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

As shown in FIG. 1, memory 104 may have stored therein an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105.

Air mover 108 may include any mechanical or electromechanical system, apparatus, or device operable to move air and/or other gases in order to cool information handling resources of information handling system 102. In some embodiments, an air mover 108 may comprise a fan (e.g., a rotating arrangement of vanes or blades which act on the air). In other embodiments, an air mover 108 may comprise a blower (e.g., a centrifugal fan that employs rotating impellers to accelerate air received at its intake and change the direction of the airflow). In operation, an air mover 108 may cool information handling resources of information handling system 102 by drawing cool air into an enclosure housing the information handling resources from outside the chassis, expelling warm air from inside the enclosure to the outside of such enclosure, and/or moving air across one or more heat sinks (not explicitly shown) internal to the enclosure to cool one or more information handling resources.

Neural processing unit 110 may be any system, device, or apparatus within a class of specialized hardware accelerators which accelerate artificial intelligence and machine learning applications, including artificial neural networks and computer vision. Typical applications include algorithms for robotics, Internet of Things, and other data-intensive or sensor-driven tasks.

User interface 114 may comprise any instrumentality or aggregation of instrumentalities by which a user may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a user (e.g., via a display device, speaker, and/or other data output device). As shown in FIG. 1, user interface 114 may include one or more of each of a display 116, microphone 118, a pointing device 120, a keyboard 122, speakers 124, a fingerprint reader 130, camera 132, visual indicators 134, and/or one or more other input and/or output devices.

Display 116 may comprise any suitable system, device, or apparatus configured to display human-perceptible graphical data and/or alphanumeric data to a user. For example, in some embodiments, display 116 may comprise a liquid crystal display or organic light-emitting diode display.

A microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMS) microphone, etc.) wherein such sound is converted to an electrical signal using a diaphragm or membrane having an electrical capacitance that varies based on sonic vibrations received at the diaphragm or membrane.

Pointing device 120 may comprise any suitable system, device, or apparatus to permit a user to control position of a cursor on display device 116. For example, pointing device 120 may include a mouse, trackball, trackpad, or other suitable device.

Keyboard 122 may comprise any system, device, or apparatus modeled after a typewriter keyboard which uses an arrangement of buttons or keys to act as mechanical levers or electronic switches to allow a user to enter text, numbers, and/or symbols into operating system 106 or application software running on operating system 106.

A speaker 124 may comprise any system, device, or apparatus configured to produce sound in response to electrical audio signal input.

Fingerprint reader 130 may include any system, device, or apparatus configured to obtain an image of a person's fingerprint, and communicate data representative of the fingerprint image to processor 103. For example, in some embodiments, fingerprint reader 130 may include a capacitive scanner that uses electrical capacitors (and thus electric current) to form an image of a fingerprint. However, in other embodiments fingerprint reader 130 may include an optical scanner that captures a visual image of a fingerprint using a digital camera, an ultrasonic fingerprint scanner that uses high-frequency sound waves to penetrate the epidermal (outer) layer of the user's skin, or a thermal scanner that senses the temperature differences on the contact surface, in between fingerprint ridges and valleys. In these and other embodiments, fingerprint reader 130 may be integrated within a button or key of keyboard 122.

Camera 132 may comprise any system, device, or apparatus configured to record images (moving or still) into one or more electrical signals that may be processed by processor 103.

A visual indicator 134 may comprise any system, device, or apparatus located on the exterior of information handling system 102 and configured to generate visible light to indicate information regarding information handling system 102 or its various components. For example, in some embodiments, a visual indicator 134 may include a light-emitting diode.

In addition to processor 103, memory 104, BIOS 105, air mover 108, neural processing unit 110, and user interface 114, information handling system 102 may include one or more other information handling resources 128. Such an information handling resource 128 may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
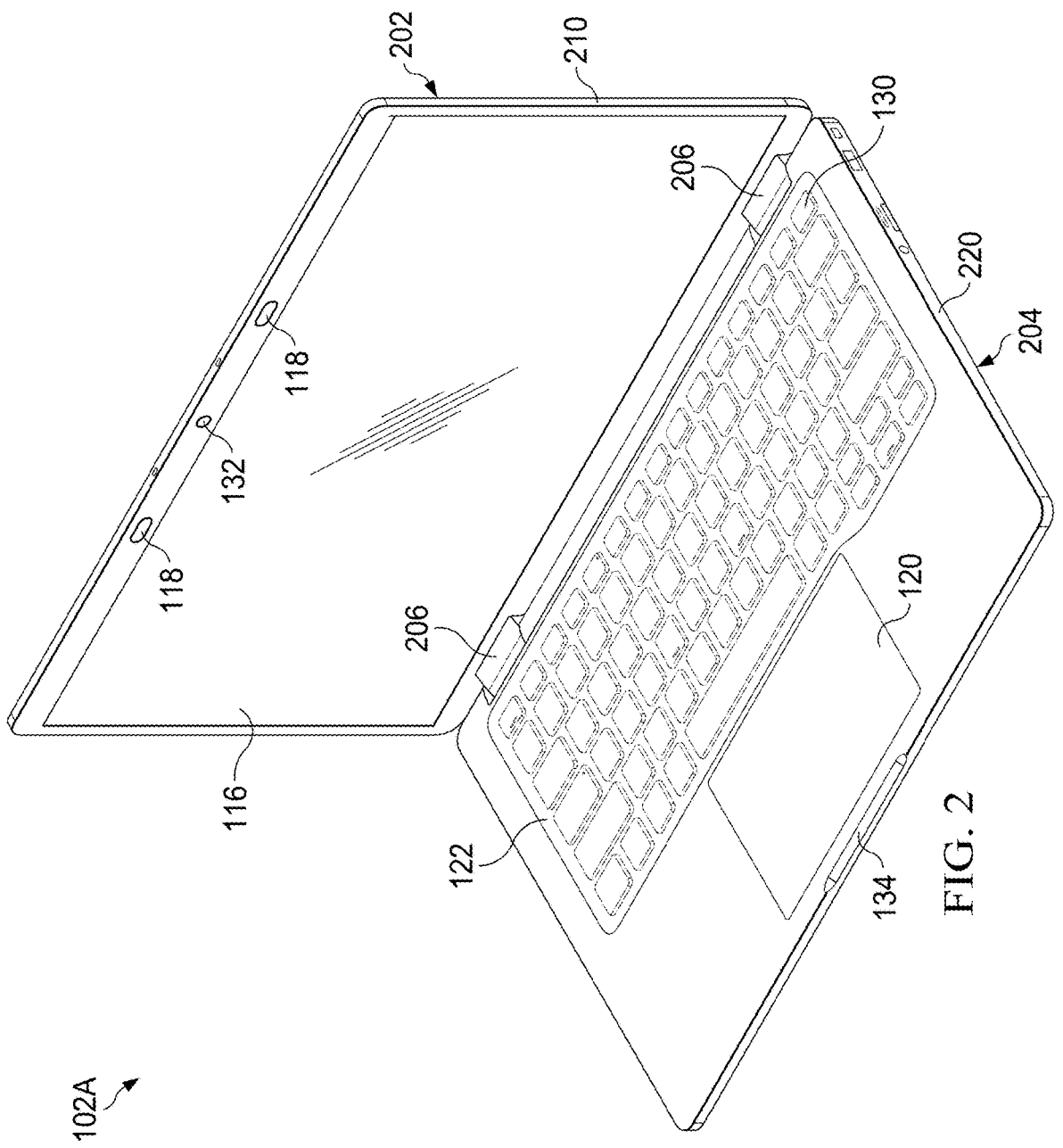
FIG. 2 illustrates an isometric perspective view of selected components of an example notebook in an open position of the notebook, in accordance with embodiments of the present disclosure.
Figure 3:
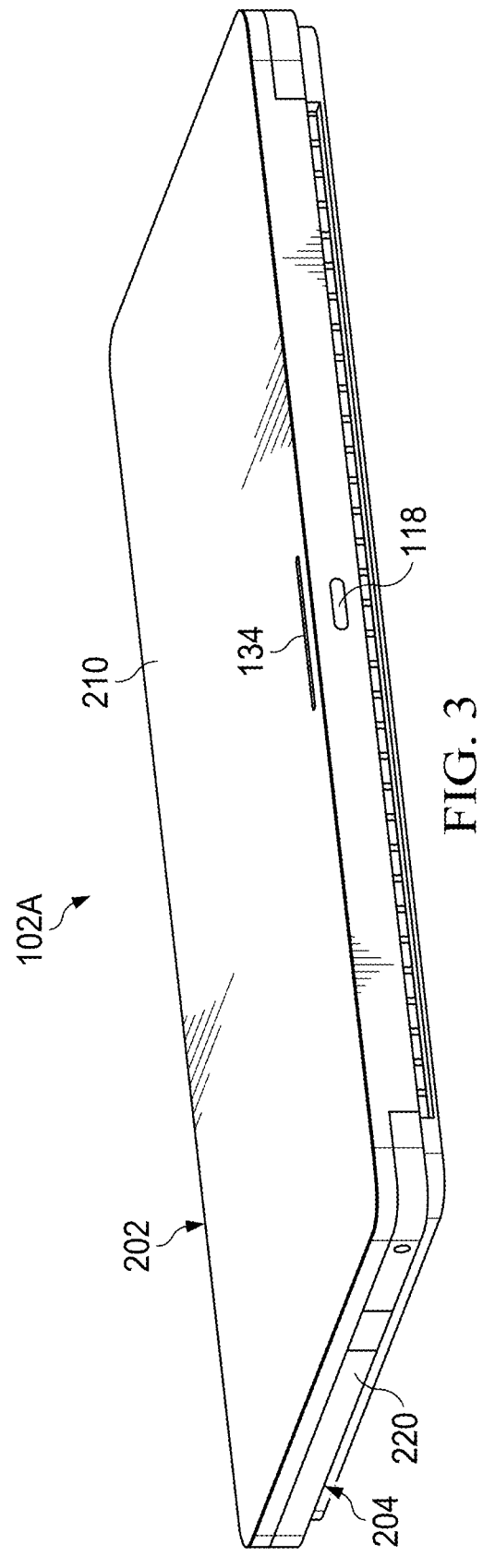
FIG. 3 illustrates an isometric perspective view of selected components of the example notebook of FIG. 2 in a closed position, in accordance with embodiments of the present disclosure.
Figure 4:
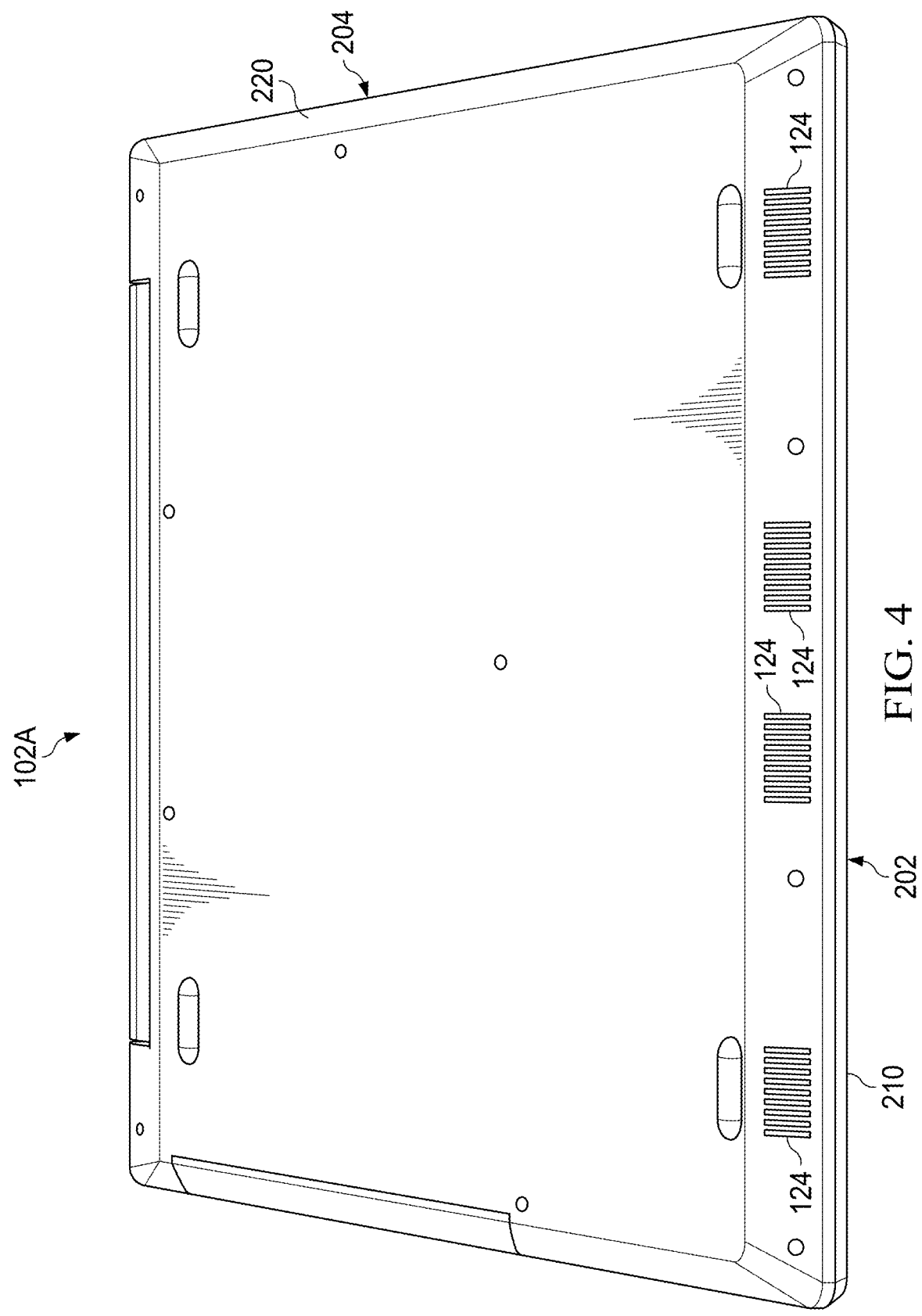
FIG. 4 illustrates another isometric perspective view of selected components of the example notebook of FIG. 2 in a closed position, in accordance with embodiments of the present disclosure.

FIG. 2 illustrates an isometric perspective view of selected components of an example notebook 102A in an open position, in accordance with embodiments of the present disclosure. FIG. 3 illustrates an isometric perspective view of selected components of example notebook 102A in a closed position, in accordance with embodiments of the present disclosure. FIG. 4 illustrates another isometric perspective view of selected components of example notebook 102A in a closed position, in accordance with embodiments of the present disclosure.

Notebook 102A may implement information handling system 102. As shown in FIG. 2, notebook 102A may include a display assembly 202 and a keyboard assembly 204 rotatably coupled to one another via one or more hinges 206. Display assembly 202 may comprise a housing 210 that may house components of notebook 102A including a display 116. Keyboard assembly 204 may comprise a housing 220 that may house components of notebook 102A including keyboard 122 for inputting information to notebook 102A. Keyboard assembly 204 may also include other components of information handling system 102 (e.g., processor 103, memory 104, BIOS 105, certain components of user interface 114, information handling resources 128, etc.) not explicitly depicted in FIG. 2. Also as shown in FIGS. 2-4, the various components of user interface 114 may be located at selected locations on housing 210 and housing 220.

FIG. 5 illustrates a flow chart of an example method 500 for controlling audio and component systems of notebook 102A between an open position and a closed position of notebook 102A, in accordance with embodiments of the present disclosure. According to some embodiments, method 500 may begin at step 502. As noted above, teachings of the present disclosure may be implemented in a variety of configurations of notebook 102A. As such, the preferred initialization point for method 500 and the order of the steps comprising method 500 may depend on the implementation chosen.

At step 502, notebook 102A may be powered on (e.g., by a user activating a power button or taking other action). At step 504, processor 103 may determine whether notebook 102A is in an open position or a closed position. If in an open position, method 500 may proceed to step 506. Otherwise, if in a closed position, method 500 may proceed to step 508.

At step 506, BIOS 105 and operating system 106 may operate to execute a "normal" startup mode for notebook 102A and may enable audio devices and system components for optimized operation in such normal startup mode. For example, processor 103 may enable most components of user interface 114 (except for visual indicators 134 and certain microphones 118, such as any microphones 118 located at a rear of notebook 102A), and allow air mover 108 to operate without restriction. In addition, processor 103 may execute an audio application programming interface (API) to enable spatial audio for speakers 124. After completion of step 506, method 500 may end.

At step 508, BIOS 105 and operating system 106 may operate to execute a "special" startup mode for notebook 102A to operate notebook 102A in the closed position, and may selectively enable and disable audio devices and system components for optimized operation in such special startup mode, including disabling of audio devices and system components to minimize power consumption. For example, processor 103 may disable selected speakers 124 while leaving other selected speakers 124 enabled, may disable display 116, pointing device 120, keyboard 122, fingerprint reader 130, and camera 132, while limiting a speed of air mover 108 to minimize acoustic noise proximate to microphones 118. Further, processor 103 may enable visual indicators 134 to allow visual feedback to users of notebook 102A. In addition, neural processing unit 110 may be enabled. Also, processor 103 may execute a secondary audio API to enable standard audio for speakers 124. After completion of step 508, method 500 may end.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented in whole or part using a variety of configurations of notebook 102A and/or any other system operable to implement method 500. In certain embodiments, method 500 may be implemented partially or fully in software and/or firmware embodied in computer-readable media.

While the terms "top," "bottom," "front," "back," and "side" are used for purposes of exposition and clarity, such terms are not intended to limit any of the components disclosed herein to a particular orientation or configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a keyboard assembly;
a display assembly rotatably coupled to the keyboard assembly;
a user interface comprising input/output devices; and
a processor configured to:
    when the display assembly is in an open position relative to the keyboard assembly, selectively enable a first set of the input/output devices and selectively disable a second set of the input/output devices to optimize operation in a normal operational mode of the information handling system, wherein the second set of input/output devices comprises one or more of a microphone of the user interface and a visual indicator of the user interface; and
    when the display assembly is in a closed position relative to the keyboard assembly, selectively enable a third set of the input/output devices different from the first set of input/output devices and selectively disable a fourth set of the input/output devices different from the second set of input/output devices to optimize operation in a special operational mode of the information handling system.

2. The information handling system of claim 1, further comprising an air mover and wherein the processor is configured to:
    cause unrestricted operation of the air mover when the display assembly is in the open position relative to the keyboard assembly; and
    apply a maximum speed to operation of the air mover when the display assembly is in the closed position relative to the keyboard assembly.

3. The information handling system of claim 1, further comprising a neural processing unit and wherein the processor is configured to enable operation of the neural processing unit when the display assembly is in the closed position relative to the keyboard assembly.

4. The information handling system of claim 1, wherein the first set of input/output devices comprises one or more of a speaker of the user interface, a microphone of the user interface, a camera of the user interface, a display of the user interface, a keyboard of the user interface, a fingerprint reader of the user interface, and a pointing device of the user interface.

5. The information handling system of claim 1, wherein the third set of input/output devices comprises one or more of a speaker of the user interface, a microphone of the user interface, and a visual indicator of the user interface.

6. The information handling system of claim 1, wherein the fourth set of input/output devices comprises one or more of a speaker of the user interface, a camera of the user interface, a display of the user interface, a keyboard of the user interface, a fingerprint reader of the user interface, and a pointing device of the user interface.

7. A method comprising, in an information handling system having a keyboard assembly, a display assembly rotatably coupled to the keyboard assembly, and a user interface comprising input/output devices:
    when the display assembly is in an open position relative to the keyboard assembly, selectively enabling a first set of the input/output devices and selectively disabling a second set of the input/output devices to optimize operation in a normal operational mode of the information handling system, wherein the second set of input/output devices comprises one or more of a microphone of the user interface and a visual indicator of the user interface; and
    when the display assembly is in a closed position relative to the keyboard assembly, selectively enabling a third set of the input/output devices different from the first set of input/output devices and selectively disabling a fourth set of the input/output devices different from the second set of input/output devices to optimize operation in a special operational mode of the information handling system.

8. The method of claim 7, wherein:
the information handling system further includes an air mover; and
the method further comprises:
    causing unrestricted operation of the air mover when the display assembly is in the open position relative to the keyboard assembly; and
    applying a maximum speed to operation of the air mover when the display assembly is in the closed position relative to the keyboard assembly.

9. The method of claim 7, wherein:
the information handling system further includes a neural processing unit; and
the method further comprises enabling operation of the neural processing unit when the display assembly is in the closed position relative to the keyboard assembly.

10. The method of claim 7, wherein the first set of input/output devices comprises one or more of a speaker of the user interface, a microphone of the user interface, a camera of the user interface, a display of the user interface, a keyboard of the user interface, a fingerprint reader of the user interface, and a pointing device of the user interface.

11. The method of claim 7, wherein the third set of input/output devices comprises one or more of a speaker of the user interface, a microphone of the user interface, and a visual indicator of the user interface.

12. The method of claim 7, wherein the fourth set of input/output devices comprises one or more of a speaker of the user interface, a camera of the user interface, a display of the user interface, a keyboard of the user interface, a fingerprint reader of the user interface, and a pointing device of the user interface.

13. An article of manufacture comprising:
a non-transitory computer-readable medium; and
computer-executable instructions carried on the computer-readable medium, the instructions readable by a processor, the instructions, when read and executed, for causing the processor to, in an information handling system having a keyboard assembly, a display assembly rotatably coupled to the keyboard assembly, and a user interface comprising input/output devices:
    when the display assembly is in an open position relative to the keyboard assembly, selectively enable a first set of the input/output devices and selectively disable a second set of the input/output devices to optimize operation in a normal operational mode of the information handling system, wherein the second set of input/output devices comprises one or more of a microphone of the user interface and a visual indicator of the user interface; and when the display assembly is in a closed position relative to the keyboard assembly, selectively enable a third set of the input/output devices different from the first set of input/output devices and selectively disable a fourth set of the input/output devices different from the second set of input/output devices to optimize operation in a special operational mode of the information handling system.

14. The article of claim 13, wherein:

the information handling system further includes an air mover; and the instructions for further causing the processor to:

cause unrestricted operation of the air mover when the display assembly is in the open position relative to the keyboard assembly; and apply a maximum speed to operation of the air mover when the display assembly is in the closed position relative to the keyboard assembly.

15. The article of claim 13, wherein:

the information handling system further includes a neural processing unit; and the instructions for further causing the processor to enable operation of the neural processing unit when the display assembly is in the closed position relative to the keyboard assembly.

16. The article of claim 13, wherein the first set of input/output devices comprises one or more of a speaker of the user interface, a microphone of the user interface, a camera of the user interface, a display of the user interface, a keyboard of the user interface, a fingerprint reader of the user interface, and a pointing device of the user interface.

17. The article of claim 13, wherein the third set of input/output devices comprises one or more of a speaker of the user interface, a microphone of the user interface, and a visual indicator of the user interface.

18. The article of claim 13, wherein the fourth set of input/output devices comprises one or more of a speaker of the user interface, a camera of the user interface, a display of the user interface, a keyboard of the user interface, a fingerprint reader of the user interface, and a pointing device of the user interface.

* * * * *